(12) United States Patent
Miyazaki et al.

(10) Patent No.: US 8,651,671 B2
(45) Date of Patent: Feb. 18, 2014

(54) PROJECTION DISPLAY DEVICE

(75) Inventors: Kanto Miyazaki, Tokyo (JP); Kazuaki Murayama, Tokyo (JP)

(73) Assignee: Olympus Corporation, Tokyo (JP)

( * ) Notice: Subject to any disclaimer, the term of this patent is extended or adjusted under 35 U.S.C. 154(b) by 436 days.

(21) Appl. No.: 12/798,875

(22) Filed: Apr. 12, 2010

(65) Prior Publication Data

US 2010/0271599 A1    Oct. 28, 2010

(30) Foreign Application Priority Data

Apr. 23, 2009   (JP) ................................. 2009-105708

(51) Int. Cl.
    *G03B 21/28*    (2006.01)
(52) U.S. Cl.
    USPC .......................................... 353/98; 359/599
(58) Field of Classification Search
    USPC ............. 353/98; 362/259; 359/599, 707–718, 359/722, 723
    See application file for complete search history.

(56) References Cited

U.S. PATENT DOCUMENTS

| | | | |
|---|---|---|---|
| 6,594,090 B2 * | 7/2003 | Kruschwitz et al. | 359/707 |
| 7,646,518 B2 * | 1/2010 | Kasazumi | 359/196.1 |
| 8,031,403 B2 * | 10/2011 | Dunphy et al. | 359/599 |
| 2002/0024636 A1 | 2/2002 | Okamori et al. | |
| 2003/0039036 A1 * | 2/2003 | Kruschwitz et al. | 359/707 |
| 2006/0227293 A1 * | 10/2006 | Kasazumi et al. | 353/30 |
| 2007/0146875 A1 | 6/2007 | Niwa et al. | |
| 2007/0273849 A1 | 11/2007 | Takeda | |
| 2008/0165401 A1 | 7/2008 | Kasazumi | |
| 2008/0204667 A1 * | 8/2008 | Kobori et al. | 353/38 |
| 2008/0252863 A1 | 10/2008 | Kojima et al. | |
| 2010/0165301 A1 | 7/2010 | Kojima et al. | |

FOREIGN PATENT DOCUMENTS

| | | |
|---|---|---|
| JP | 06-208089 | 7/1994 |
| JP | 2003-098476 | 4/2003 |
| JP | 2005-301164 | 10/2005 |
| JP | 2006-343663 | 12/2006 |
| JP | 2007-033577 | 2/2007 |

(Continued)

OTHER PUBLICATIONS

Notice of Rejection Grounds, dated Mar. 12, 2013, issued in corresponding Japanese Patent Application No. 2009-105708.

(Continued)

*Primary Examiner* — Francis M Legasse, Jr.
*Assistant Examiner* — Jerry Brooks
(74) *Attorney, Agent, or Firm* — Kenyon & Kenyon LLP

(57) ABSTRACT

A projection display device which displays an image by projecting the image on a screen includes a laser light source 1 (1a, 1b, 1c) for emitting coherent light, a display device 3 for forming an image to be displayed on a screen 5 in an area illuminated by a luminous flux from the laser light source 1, a first diffusion plate 14 for diffusing a luminous flux, and a second diffusion plate 15 for diffusing a luminous flux. The first diffusion plate 14 is provided in at least one of a conjugate position of the laser light source 1 or the vicinity of the conjugate position in the optical path of the optical system including the laser light source 1 through the screen 5. The second diffusion plate 15 is provided in at least one of a conjugate position of the display device 3 or the vicinity of the conjugate position. At least one of the first diffusion plate 14 and the second diffusion plate 15 fluctuates perpendicularly to an optical axis.

10 Claims, 20 Drawing Sheets

(56) References Cited

FOREIGN PATENT DOCUMENTS

| | | |
|---|---|---|
| JP | 2007-279204 | 10/2007 |
| JP | 2008-096777 | 4/2008 |
| JP | 2008-122823 | 5/2008 |
| JP | 2008-191279 | 8/2008 |
| JP | 2008-268271 | 11/2008 |
| JP | 2010-152176 | 7/2010 |
| WO | 2005/064398 | 7/2005 |
| WO | 2006/090681 | 8/2006 |

OTHER PUBLICATIONS

Office Action, dated Jul. 3, 2012, issued in related U.S. Appl. No. 12/798,867.

Office Action, dated Apr. 25, 2012, issued in related U.S. Appl. No. 12/798,867.

Notice of Rejection of Grounds, dated on Mar. 5, 2013, issued in corresponding Japanese Patent Application No. 2009-105701.

\* cited by examiner

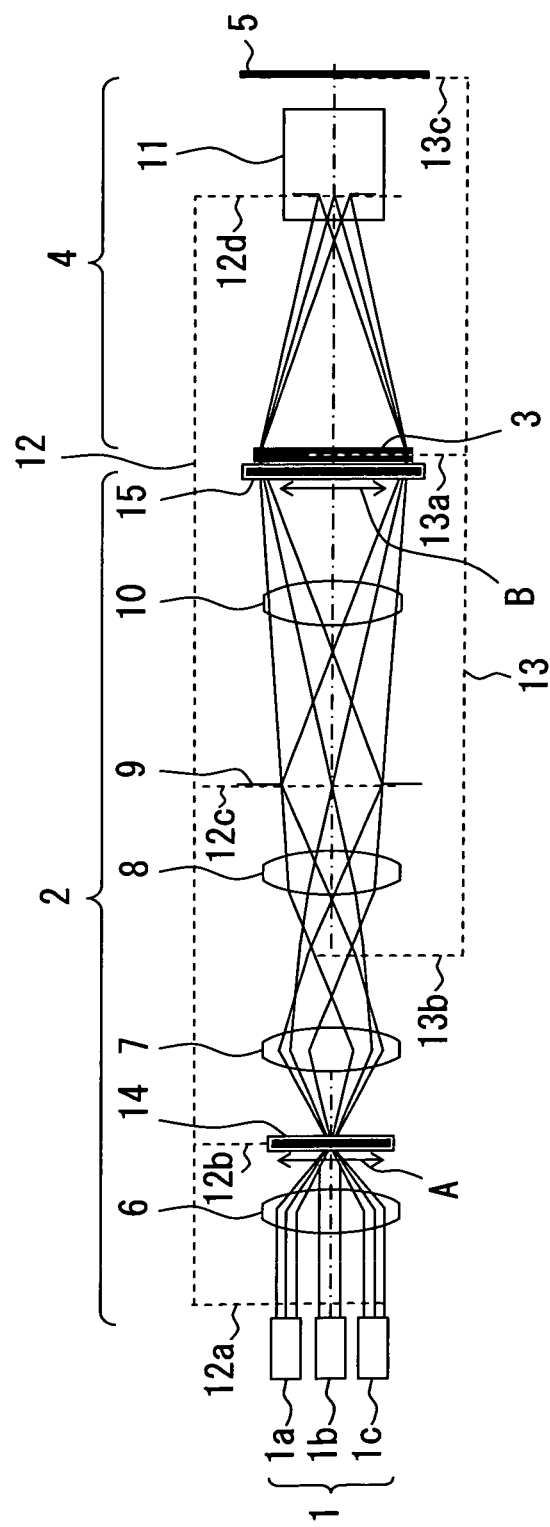
F I G. 7

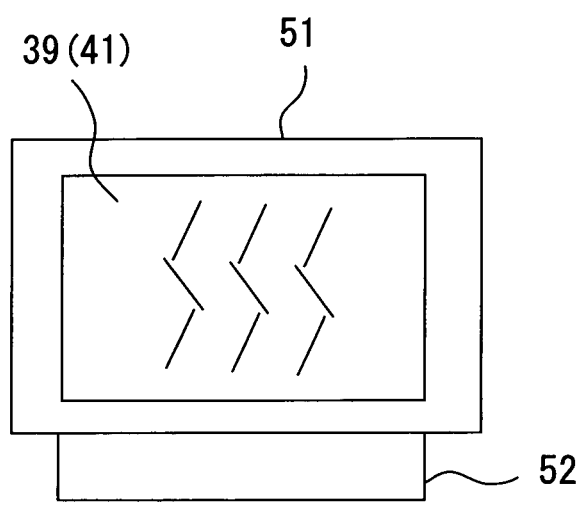
F I G. 1 9

PROJECTION DISPLAY DEVICE

CROSS REFERENCE TO RELATED APPLICATIONS

This application is based upon and claims the benefit of priority from the prior Japanese Application No. 2009-105708, filed Apr. 23, 2009, the entire contents of which are incorporated herein by reference.

BACKGROUND OF THE INVENTION

1. Field of the Invention

The present invention relates to a projection display device such as a projector etc., and more specifically to a projection display device for displaying an image by projecting the image on the screen etc. using a display device.

2. Description of the Related Art

Conventionally, a lamp light source such as an extra high pressure mercury lamp etc. has been used as a light source of a projection display device using a display device. Since such a lamplight source is short-life, a maintenance operation such as exchanging a lamp is frequently performed. In addition, when color images are displayed, it is necessary to provide, for example, an optical system for taking out red light, green light, and blue light from white light emitted from a lamp light source. Therefore, the device configuration is complicated and the light use efficiency is reduced.

On the other hand, although a projection display device using an LED light source has been proposed as a light source, it is low in the light use efficiency of the LED, thereby failing in attaining sufficient luminance on the displayed image.

Therefore, there has been an attempt to use a laser light source such as a semiconductor laser etc. as a light source of a projection display device. Since the laser light source is longer-life than the lamp light source, maintaining operations are not required substantially. In addition, since laser light can be directly modulated depending on a displayed image when the laser light source is used, the device configuration is simple and the light use efficiency can be improved. Furthermore, using a laser light source, a larger color reproduction area can be obtained.

However, a laser light source has high coherence. Therefore, when a laser light source is used as a light source of a projection display device, a pattern of high-contrast spots such as a speckle, speckle noise, speckle patterns, etc. (hereinafter referred to simply as "speckle") is formed on the screen, thereby degrading the quality of displayed images. Therefore, when a laser light source is used as a light source, it is important to reduce the speckle. Accordingly, the technology of reducing the speckle has been proposed in the following variations.

FIG. 1 is a schematic diagram of an operating illumination device disclosed by the patent document 1 (Japanese Laid-open Patent Publication No. 2005-301164). An illumination device 101 illustrated in FIG. 1 includes a laser light source 102, an electromagnet 103, an oscillation plate 104 and a diffusion plate 105. The oscillation plate 104 is arranged opposite the electromagnet 103, and made by a magnetic material. The diffusion plate 105 is arranged at one end of the oscillation plate 104, and the laser light emitted from the laser light source 102 enters the diffusion plate 105. Then, the diffusion plate 105 vibrates substantially perpendicularly to the laser light emission direction from laser light source 102 based on the operation of the electromagnet 103, thereby reducing the speckle.

FIG. 2 is an explanatory view of the rough configuration of the projector disclosed by the patent document 2 (Japanese Laid-open Patent Publication No. 2008-191279). A projector 111 illustrated in FIG. 2 includes a light source (laser light source devices 112R, 112G, and 112B), an intermediate image forming unit (first projection optical system 113), an optical system for forming images (second projection optical system 114), and a diffusibility change unit (second diffusion element 115, rotation drive unit 116). The light source emits a coherent light. The intermediate image forming unit forms an intermediate image using the light from the light source. The optical system for forming images forms an image on the display surface with the light from the intermediate image. The diffusibility change unit has a diffusing surface in the position shifted from the intermediate image forming surface on which an intermediate image is formed, and in the position of the optical path from the intermediate image forming unit to the optical system for forming images including the intermediate image forming unit, and changes with time the diffusibility on the surface along the diffusing surface. Then, by the operation of the diffusibility change unit, the speckle is to be reduced.

FIG. 3 is an explanatory view of the behavior etc. of the light in the optical system of the projector disclosed by the patent document 3 (Japanese Laid-open Patent Publication No. 2008-122823). The optical system illustrated in FIG. 3 includes a light source unit 121 for providing coherent light, a spatial light modulation device 123 for modulating the coherent light from the light source unit 121 depending on the image signal and emitting the light from an emission unit 122, and a diffusion unit 124 for diffusing the light from the emission unit 122 by a transmission. The diffusion unit 124 is provided and operated in a position close to the emission unit 122 so that the speckle can be reduced.

FIG. 4 illustrates a coherent light display device having a diffusion element as disclosed by the patent document 4 (Japanese Laid-open Patent Publication No. 06-208089). In the device illustrated in FIG. 4, the coherent light is transmitted through a rotary diffusion element 132 to illuminating the spatial light modulator 131. The rotary diffusion element 132 moves on a screen 133 at a speed at which an interference pattern cannot be detected by human eyes, thereby reducing the speckle.

SUMMARY OF THE INVENTION

The projection display device according to an aspect of the present invention displays an image by projecting the image on a screen, and includes at least one light source, a display device, a first diffusion unit, and a second diffusion unit. The light source emits coherent light. The display device forms an image to be displayed on the screen in an area illuminated by a luminous flux from the light source. The first diffusion unit diffuses the luminous flux. The second diffusion unit diffuses the luminous flux. The first diffusion unit is provided in at least one of the light source conjugate position and the vicinity of the position in the optical path of the optical system including the light source through the screen. The second diffusion unit is provided in at least one of the display device conjugate position and the vicinity of the position in the optical path of the optical system. At least one of the first diffusion unit and the second diffusion unit fluctuates perpendicularly to the optical axis.

The projection display device according to another aspect of the present invention displays an image by projecting the image on a screen, and includes at least one light source, an optical system for illumination, a display device, an optical system for projection, a first diffusion unit, a second diffusion unit, and a luminous flux intensity leveling unit. The light source emits coherent light. The optical system for illumination propagates the luminous flux emitted from the light source to a predetermined optical path and leads the flux towards the screen. The display device forms an image to be displayed on the screen in the area illuminated by the luminous flux lead by the optical system for illumination. The optical system for projection scales up and projects on the screen the image formed in the illuminated area of the display device. The first diffusion unit diffuses the luminous flux. The second diffusion unit diffuses the luminous flux. The luminous flux intensity leveling unit levels the intensity of the luminous flux. The luminous flux intensity leveling unit is provided in the optical system for illumination. The first diffusion unit is provided on the luminous flux incident surface of the luminous flux intensity leveling unit or in the vicinity of the position. The second diffusion unit is provided on the luminous flux emission surface of the luminous flux intensity leveling unit or in the vicinity of the position. At least one of the first diffusion unit and the second diffusion unit fluctuates perpendicularly to the optical axis.

BRIEF DESCRIPTION OF THE DRAWINGS

FIG. 7 is the second configuration example of the projection display device according to the embodiment 1;

FIG. 19 illustrates an ultrasonic motor fixed to an optical diffusion device via a frame.

DESCRIPTION OF THE PREFERRED EMBODIMENT

The embodiments of the present invention are described below with reference to the attached drawings.

[Embodiment 1]

The projection display device according to the embodiment 1 of the present invention displays an image by projecting the image on the screen, and includes at least one light source, a display device, a first diffusion plate (an example of the first diffusion unit) and a second diffusion plate (an example of the second diffusion unit). The light source emits coherent light. The display device forms an image to be displayed on the screen in an area illuminated by a luminous flux from the light source. The first diffusion plate diffuses the luminous flux. The second diffusion plate diffuses the luminous flux. The first diffusion plate is provided in at least one of the light source conjugate position and the vicinity of the positions in the optical path of the optical system including the light source through the screen. The second diffusion plate is provided in at least one of the display device conjugate position and the vicinity of the positions in the optical path of the optical system. At least one of the first diffusion plate and the second diffusion plate fluctuates perpendicularly to the optical axis. However, the fluctuating diffusion plate fluctuates perpendicularly to the optical axis in the scope within the optical path of the optical system.

Figure 5:
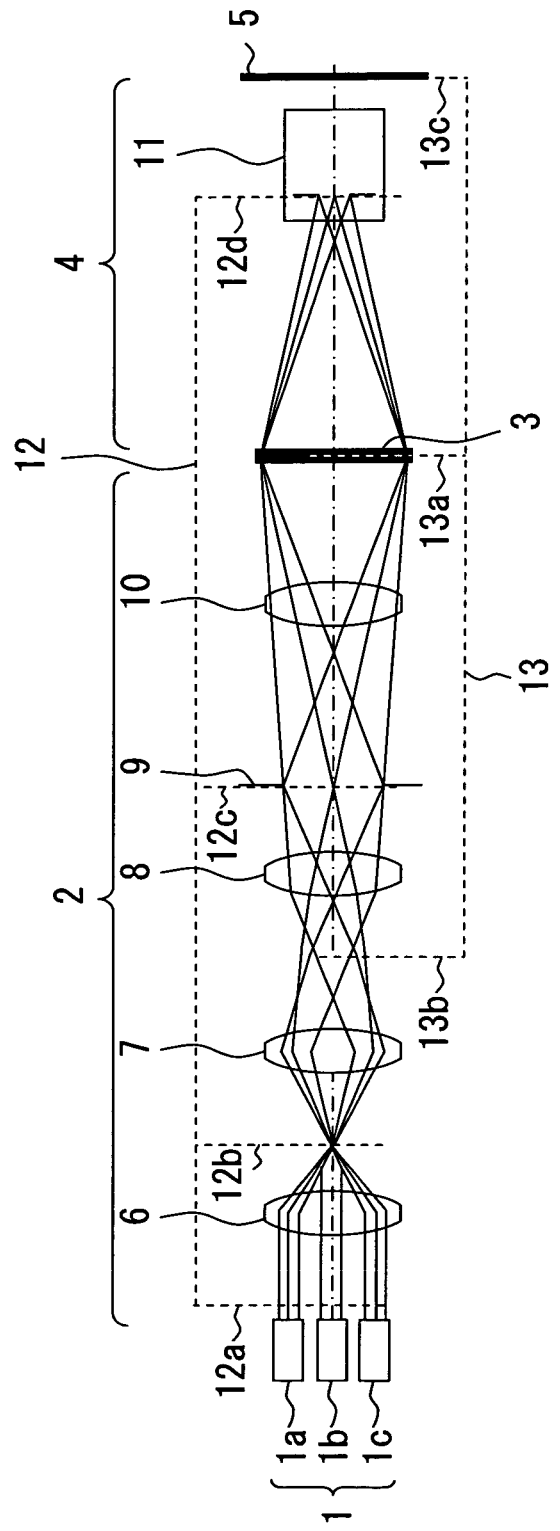
FIG. 5 is a configuration before arranging a first diffusion plate and a second diffusion plate in an example of a configuration of the projection display device according to the embodiment 1.

FIG. 5 is a configuration before arranging the first diffusion plate and the second diffusion plate in an example of a configuration of the projection display device according to the present embodiment.

In the projection display device according to the present embodiment, as described above, the first diffusion plate is provided in at least one of the light source conjugate position and the vicinity of the positions in the optical path of the optical system including the light source through the screen, and the second diffusion plate is provided in at least one of the display device conjugate position and the vicinity of the positions in the optical path of the optical system. Therefore, there are a plurality of combinations of the arrangement positions of the first diffusion plate and the second diffusion plate. First, an example of a configuration of the projection display device according to the present embodiment excluding the first and second diffusion plates is described below with reference to FIG. 5.

As illustrated in FIG. 5, the projection display device according to the present embodiment excluding the first and second diffusion plates includes three laser light sources 1 (1a, 1b, and 1c), an optical system for illumination 2, a display device 3, an optical system for projection 4, and a screen 5.

Each of the three laser light sources 1 emits coherent light, for example, as a red laser light source, a green laser light source, and a blue laser light source.

The optical system for illumination 2 propagates the luminous flux emitted from each of the three laser light sources 1 into a predetermined optical path, leads the flux toward the screen 5, and includes a relay lens 6, a relay lens 7, a relay lens 8, a stop unit 9, and a relay lens 10. The relay lens 6 also functions as a converging lens. In this optical system for illumination 2, the luminous flux emitted from each of the three laser light sources 1 is led to the display device 3 by the relay lens 6, the relay lens 7, the relay lens 8, the stop unit 9, and the relay lens 10, and illuminates the illumination area of the display device 3.

The display device 3 forms an image to be displayed on the screen 5 in the area illuminated by the luminous flux from the optical system for illumination 2 (laser light source 1). The display device 3 transmits the luminous flux illuminating the illuminated area to form on the screen 5 the image formed in the illuminated area. The display device 3 is a transmission display device using, for example, a liquid crystal device etc.

The optical system for projection 4 is an optical system for scaling up and projecting on the screen 5 the image formed in the illuminated area of the display device 3, and includes a projection lens 11. In the optical system for projection 4, the luminous flux is transmitted through the display device 3, scaled up by a projection lens 11, and projected on the screen 5.

The three laser light sources 1 and the display device 3 are controlled by a control device not illustrated in the attached drawings.

With the above-mentioned configuration example, the positions (light source conjugate positions) having conjugate relationships with a position 12a of the luminous flux emission surface of the three laser light sources 1 in the optical path of the optical System including the three laser light sources 1 through the screen 5 are a converging position 12b by the relay lens 6, a position 12c of the stop unit 9, and a position 12d of the entrance pupil of the projection lens 11 (refer to the dotted line 12 in FIG. 5). The positions (display device conjugate positions) having conjugate relationships with a position 13a of the luminous flux incident surface of the display device 3 in the optical path of the optical system are a position 13b between the relay lens 7 and the relay lens 8 and a position 13c of the projection surface of the screen 5 (refer to the dotted line 13 in FIG. 5).

Therefore, in the projection display device according to the present embodiment, the arrangement position of the first diffusion plate is one of the position 12a of the luminous flux emission surfaces of the three laser light sources 1 or in the vicinity of the position, the converging position 12b by the relay lens 6 or in the vicinity of the position, the position 12c of the stop unit 9 or in the vicinity of the position, and the position 12d of the entrance pupil of the projection lens 11 or in the vicinity of the position, in the optical path of the optical system including the three laser light sources 1 through the screen 5. The arrangement position of the second diffusion plate is one of the position 13a of the luminous flux incident surface of the display device 3 or in the vicinity of the position, the position 13b between the relay lens 7 and the relay lens 8 or in the vicinity of the position, and the position 13c of the projection surface of the screen 5 or in the vicinity of the position, in the optical path of the optical system including the three laser light sources 1 through the screen 5.

Thus, in the projection display device according to the present embodiment, there are a plurality of combinations as the arrangement positions of the first diffusion plate and the second diffusion plate, but five representative arrangement examples are described below.

Figure 18:
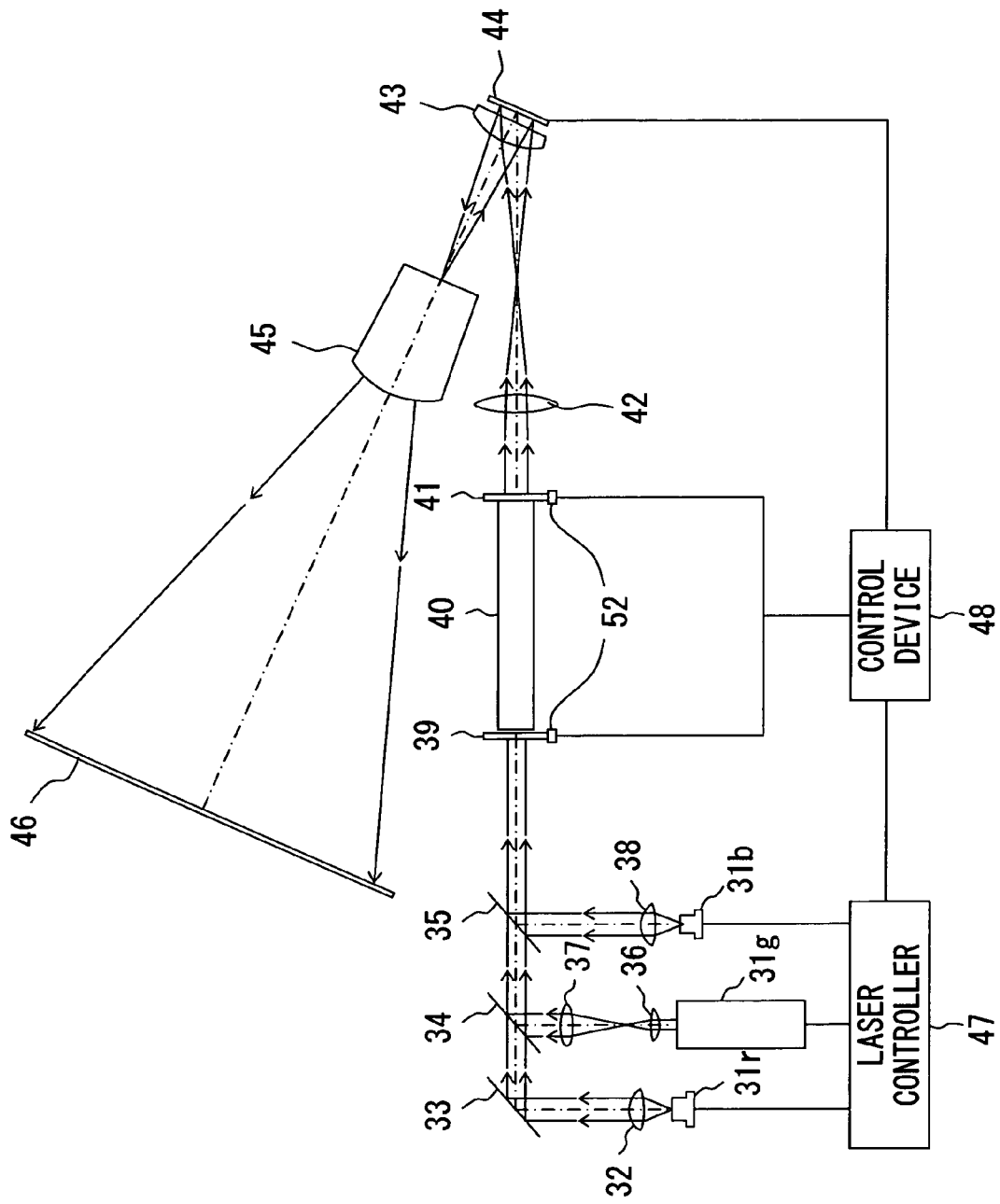
FIG. 18 is an example of a configuration of the projection display device according to the embodiment 2 using a reflective display device.

In each arrangement example, both of the first diffusion plate and the second diffusion plate fluctuate perpendicularly to the optical axis, but the configuration in which one of the plates fluctuates can be realized. Each of the first diffusion plate and the second diffusion plate is provided with an ultrasonic motor as illustrated in FIG. 18 and described later. The ultrasonic motor is an example of a unit for fluctuating a diffusion plate, and can fluctuate the diffusion plate by finely oscillating a piezoelectric element included in the ultrasonic motor. The ultrasonic motor for finely oscillating the piezoelectric element is controlled by a control device for controlling the three laser light sources 1 and the display device 3. In this case, the ultrasonic motor is controlled so that the fluctuation speed of each of the first diffusion plate and the second diffusion plate can be, for example, 2.0 mm/s or more.

Figure 6:
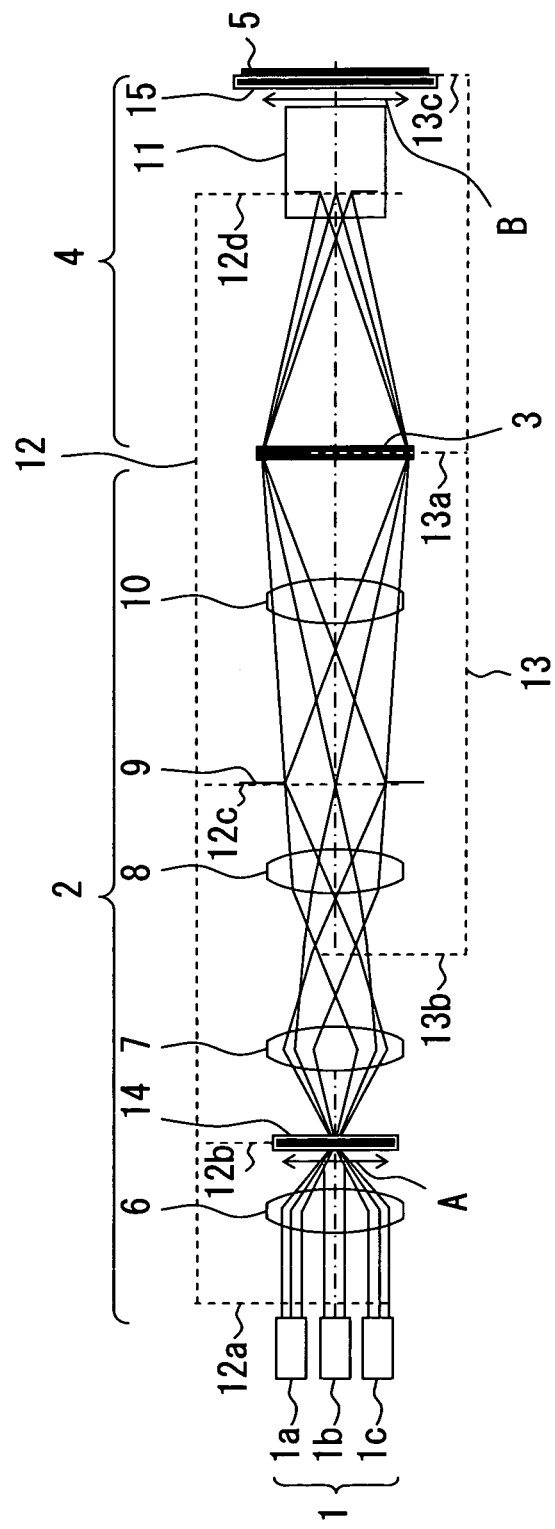
FIG. 6 is the first configuration example of the projection display device according to the embodiment 1.

FIG. 6 is the first configuration example of the projection display device according to the present embodiment.

The first configuration example illustrated in FIG. 6 is an example of arranging a first diffusion plate 14 in the converging position 12b (or in the vicinity of the position) by the relay lens 6, and arranging a second diffusion plate 15 in the position 13c (or in the vicinity of the position) of the projection surface of the screen 5. According to the present configuration example, the luminous flux converged by the relay lens 6 is diffused by the first diffusion plate 14 which fluctuates perpendicularly to the optical axis (for example the vertical direction indicated by the arrow A in FIG. 6). Furthermore, the luminous flux projected by the projection lens 11 is diffused by the second diffusion plate 15 which fluctuates perpendicularly to the optical axis (for example, the vertical direction indicated by the arrow B in FIG. 6).

FIG. 7 is the second configuration example of the projection display device according to the present embodiment.

The second configuration example illustrated in FIG. 7 is an example of arranging the first diffusion plate 14 in the converging position 12b (or in the vicinity of the position) by the relay lens 6, and arranging the second diffusion plate 15 in the position 13a (or in the vicinity of the position) of the luminous flux incident surface of the display device 3. According to the present configuration example, the luminous flux converged by the relay lens 6 is diffused by the first diffusion plate 14 which fluctuates perpendicularly to the optical axis (for example the vertical direction indicated by the arrow A in FIG. 7). Furthermore, the luminous flux transmitted through the relay lens 10 is diffused by the second diffusion plate 15 which fluctuates perpendicularly to the optical axis (for example, the vertical direction indicated by the arrow B in FIG. 7).

Figure 8:
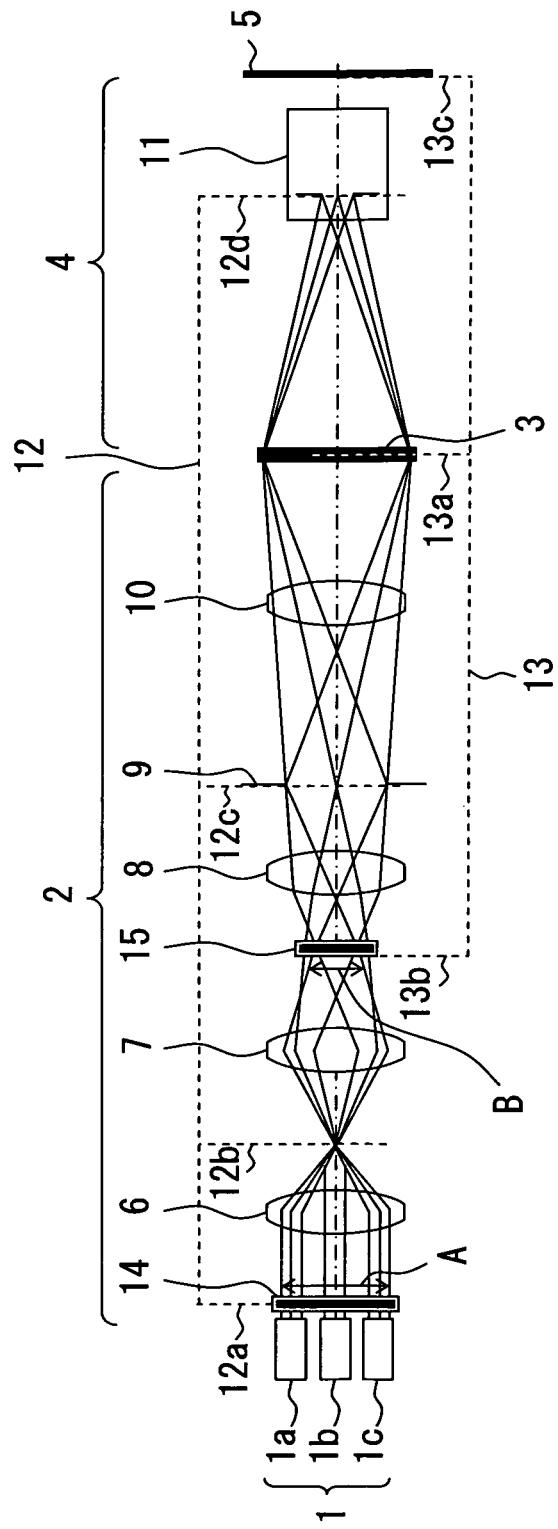
FIG. 8 is the third configuration example of the projection display device according to the embodiment 1.

FIG. 8 is the third configuration example of the projection display device according to the present embodiment.

The third configuration example illustrated in FIG. 8 is an example of arranging the first diffusion plate 14 in the position 12a (or in the vicinity of the position) of the luminous flux emission surface of the three laser light sources 1, and arranging the second diffusion plate 15 in the position 13b (or in the vicinity of the position) between the relay lens 7 and the relay lens 8. According to the present configuration example, the luminous flux emitted from each of the three laser light sources 1 is diffused by the first diffusion plate 14 which fluctuates perpendicularly to the optical axis (for example the vertical direction indicated by the arrow A in FIG. 8). Furthermore, the luminous flux transmitted through the relay lens 7 is diffused by the second diffusion plate 15 which fluctuates perpendicularly to the optical axis (for example, the vertical direction indicated by the arrow B in FIG. 8).

Figure 9:
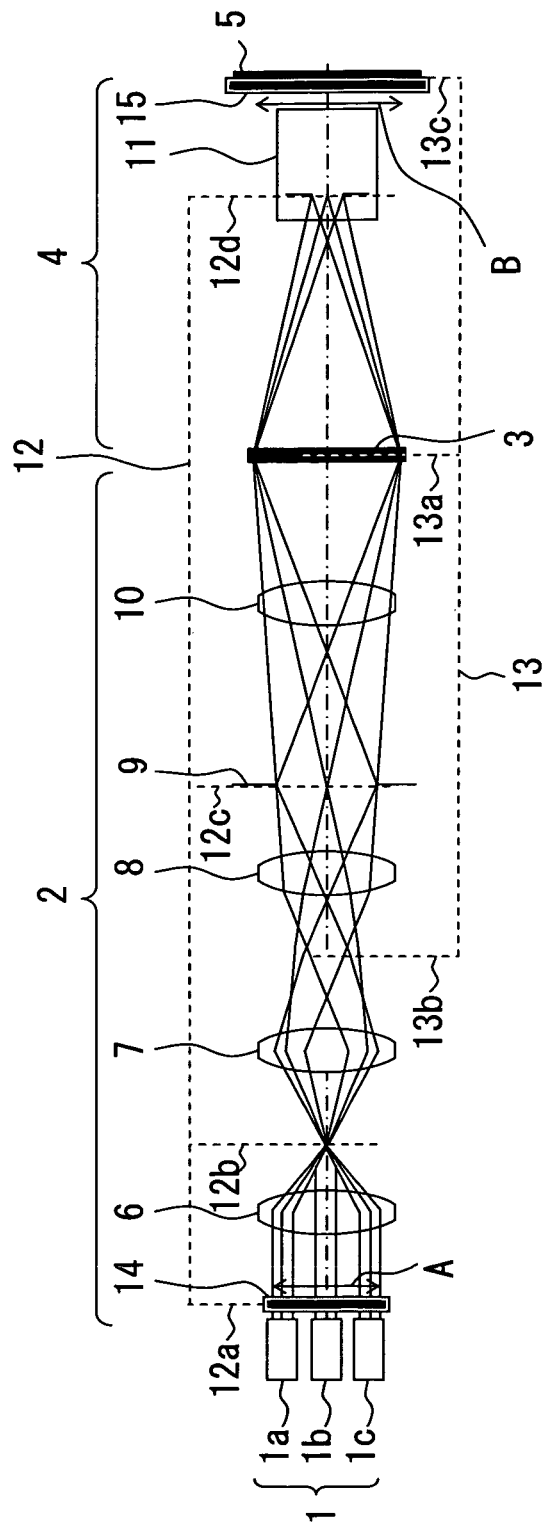
FIG. 9 is the fourth configuration example of the projection display device according to the embodiment 1.

FIG. 9 is the fourth configuration example of the projection display device according to the present embodiment.

The fourth configuration example illustrated in FIG. 9 is an example of arranging the first diffusion plate 14 in the position 12a (or in the vicinity of the position) of the luminous flux emission surface of the three laser light sources 1, and arranging the second diffusion plate 15 in the position 13c (or in the vicinity of the position) of the projection surface of the screen 5. According to the present configuration example, the luminous flux emitted from each of the three laser light sources 1 is diffused by the first diffusion plate 14 which fluctuates perpendicularly to the optical axis (for example the vertical direction indicated by the arrow A in FIG. 9). Furthermore, the luminous flux projected by the projection lens 11 is diffused by the second diffusion plate 15 which fluctuates perpendicularly to the optical axis (for example, the vertical direction indicated by the arrow B in FIG. 9).

Figure 10:
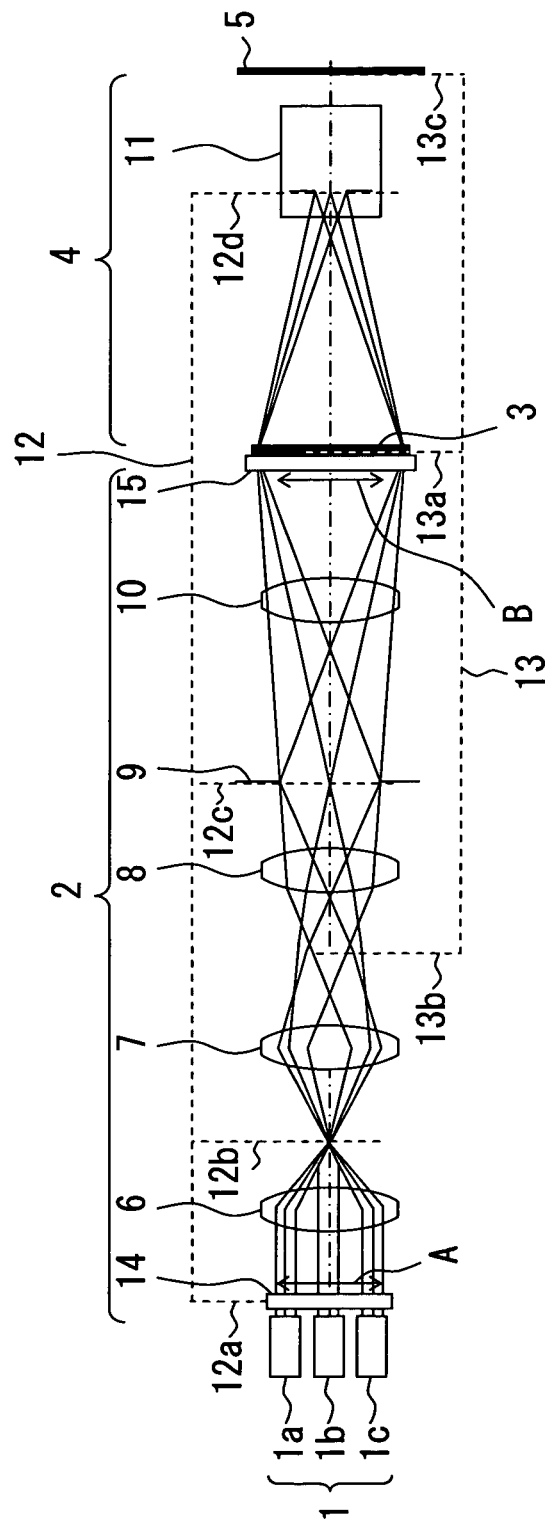
FIG. 10 is the fifth configuration example of the projection display device according to the embodiment 1.

FIG. 10 is the fifth configuration example of the projection display device according to the present embodiment.

The fifth configuration example illustrated in FIG. 10 is an example of arranging the first diffusion plate 14 in the position 12a (or in the vicinity of the position) of the luminous flux emission surface of the three laser light sources 1, and arranging the second diffusion plate 15 in the position 13a (or in the vicinity of the position) of the luminous flux incident surface of the display device 3. According to the present configuration example, the luminous flux emitted from each of the three laser light sources 1 is diffused by the first diffusion plate 14 which fluctuates perpendicularly to the optical axis (for example the vertical direction indicated by the arrow A in FIG. 10). Furthermore, the luminous flux transmitted through the relay lens 10 is diffused by the second diffusion plate 15 which fluctuates perpendicularly to the optical axis (for example, the vertical direction indicated by the arrow B in FIG. 10).

In the configuration examples illustrated in FIGS. 6 through 10, the configuration examples illustrated in FIGS. 7, 8, and 10 are also the examples of arranging the first diffusion plate 14 and the second diffusion plate 15 in the optical path of the optical system for illumination 2.

Thus, in the projection display device according to the present embodiment, in the combinations of the arrangement positions of the first diffusion plate 14 and the second diffusion plate 15, the arrangement positions can be changed.

With the above-mentioned configuration, the luminous flux from each of the three laser light sources 1 is diffused by the first diffusion plate 14 and the second diffusion plate 15 in the projection display device according to the present embodiment. Since at least one of the first diffusion plate 14 and the second diffusion plate 15 fluctuates perpendicularly to the optical axis, the speckle pattern generated when the three laser light sources 1 for emitting coherent light are used can be changed by the diffusing operation of the two diffusion plates. In addition, by fluctuating at least one diffusion plate, the luminous fluxes having speckle patterns different with time can be superposed. As a result, the speckles can be removed almost completely. That is, two diffusion plates are used, and at least one of them is fluctuated, thereby effectively removing the speckles. Therefore, as compared with the conventional device having only one diffusion plate, a higher speckle removing effect can be attained.

The speckle removing effect can be attained by providing the first diffusion plate 14 at the light source conjugate position or in the vicinity of the conjugate position, providing the second diffusion plate 15 in the display device conjugate position or in the vicinity of the conjugate position, and fluctuating at least one of the first diffusion plate 14 and the second diffusion plate 15 by the ultrasonic motor. Therefore, the speckles can be removed with a simple configuration, and a high quality image can be displayed. Since a configuration of rotating a diffusion plate is not included, a large device problem does not occur, and since no optical system for forming on a diffusion plate the images formed in the illuminated area of the display device 3 is required, a large device problem or an increased cost problem does not occur.

In the projection display device according to the present embodiment, it is desired that at least one of the first diffusion plate 14 and the second diffusion plate 15 is an optical diffusion device. The optical diffusion device is an optical element which can arbitrarily form a diffusion angle and a luminous intensity distribution form acquired when a luminous flux is transmitted, and which can acquire high uniformity for a transmitted luminous flux. When a parallel luminous flux is transmitted through the optical diffusion device, the luminous flux can be diffused like a spherically abraded concave lens by the optical diffusion device even though the optical diffusion device is tabular in shape. An optical diffusion device can be, for example, an LSD (light shaping diffuser) optical element manufactured and sold by Luminit of the U.S. It is a parallel flat plate of polycarbonate or acrylic material processed as an LSD surface for diffusing light in a specific range. The LSD surface has the same effect as a number of two-dimensionally arranged microlenses based on the optical refraction while a hologram is based on the optical diffraction. An LSD optical element can arbitrarily form a luminous intensity distribution form obtained when a luminous flux is transmitted. For example, a luminous intensity distribution form of an oval figure can be generated. It also has a high transmittance.

A reflective display device can be used as a display device in the projection display device according to the present embodiment. The reflective display device is a device for forming on a projection surface an image formed in the illuminated area by reflecting the luminous flux emitted in the illuminated area, and can be, for example, a DMD (digital micromirror device).

[Embodiment 2]

The projection display device according to the embodiment 2 of the present invention displays an image by projecting the image on the screen, and includes at least one light source, an optical system for illumination, a display device, an optical system for projection, a first diffusion plate (an example of the first diffusion unit), a second diffusion plate (an example of the second diffusion unit), and a rod integrator (an example of the luminous flux intensity leveling unit). The light source emits coherent light. The optical system for illumination propagates the luminous flux emitted from the light source into a predetermined optical path and leads it toward the screen. The display device forms an image to be displayed on the screen in the illuminated area illuminated by the luminous flux led by the optical system for illumination. The optical system for projection scales up and projects the image formed in the illuminated area of the display device on the screen. The first diffusion plate diffuses the luminous flux. The second diffusion plate diffuses the luminous flux. The rod integrator levels the intensity of the luminous flux. The rod integrator is provided in the optical system for illumination. The first diffusion plate is provided in at least one of the light source conjugate position and the vicinity of the conjugate positions in the optical path of the optical system including the light source through the screen. The second diffusion plate is provided in at least one of the display device conjugate position and the vicinity of the conjugate positions in the optical path of the optical system. Furthermore, at least one of the first diffusion plate and the second diffusion plate fluctuates perpendicularly to the optical axis. However, the fluctuating diffusion plate fluctuates perpendicularly to the optical axis in the scope of the optical path of the optical system.

Figure 11:
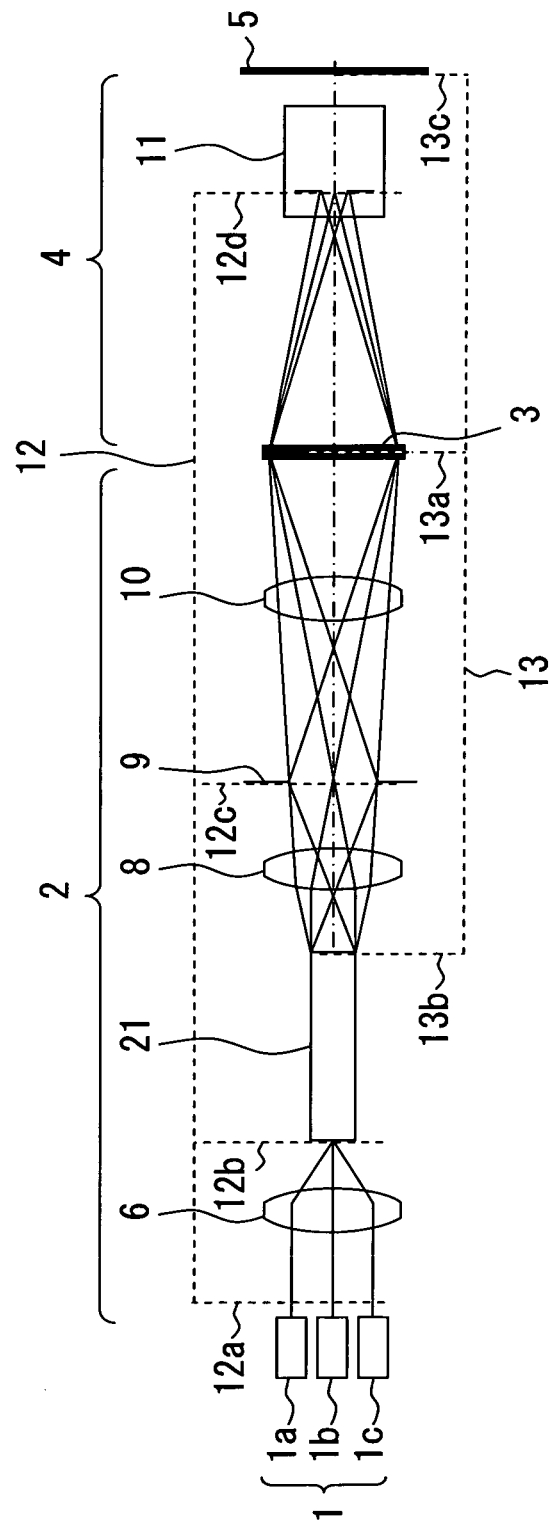
FIG. 11 is a configuration before arranging a first diffusion plate and a second diffusion plate in an example of a configuration of the projection display device according to the embodiment 2.

FIG. 11 is a configuration before arranging a first diffusion plate and a second diffusion plate in an example of a configuration of the projection display device according to the present embodiment.

As described above, in the projection display device according to the present embodiment, the first diffusion plate is also provided, as in the embodiment 1, in at least one of the light source conjugate position and the vicinity of the conjugate positions in the optical path of the optical system from the light source through the screen. Likewise, the second diffusion plate is provided in at least one of the display device conjugate position and the vicinity of the conjugate positions in the optical path of the optical system, each of the positions being the display device conjugate position or the vicinity. Therefore, there are a plurality of combinations of the first diffusion plate and the second diffusion plate as arrangement positions. Described below is an example of a configuration of the projection display device according to the present embodiment excluding the first diffusion plate and the second diffusion plate with reference to FIG. 11.

As illustrated in FIG. 11, the projection display device according to the present embodiment excluding the first diffusion plate and the second diffusion plate is different from the configuration example illustrated in FIG. 5 in that the relay lens 7 is replaced with a rod integrator 21, and other configurations are the same as those in FIG. 5. Therefore, the same components as in FIG. 5 are assigned the same reference numerals, and only the rod integrator 21 is described below.

In FIG. 11, the rod integrator 21 is provided in the optical system for illumination 2. The luminous flux incident surface of the rod integrator 21 is provided in the position 12b having a conjugate relationship with the position 12a of the luminous flux emission surface of the three laser light sources 1, that is, the light source conjugate position. In addition, the luminous flux emission surface of the rod integrator 21 is provided in the position 13b having a conjugate relationship with the position 13a of the luminous flux incident surface of the display device 3, that is, the display device conjugate position. The position 12b of the luminous flux incident surface of the rod integrator 21 is also the converging position by the relay lens 6.

With the above-mentioned configuration example, the positions (light source conjugate positions) having conjugate relationships with a position 12a of the luminous flux emission surface of the three laser light sources 1 in the optical path of the optical system including the three laser light sources 1 through the screen 5 are a position 12b of the luminous flux incident surface of the rod integrator 21, a position 12c of the stop unit 9, and a position 12d of the entrance pupil of the projection lens 11 (refer to the dotted line 12 in FIG. 11). The positions (display device conjugate positions) having conjugate relationships with a position 13a of the luminous flux incident surface of the display device 3 in the optical path of the optical system are a position 13b of the luminous flux emission surface of the rod integrator 21 and a position 13c of the projection surface of the screen 5 (refer to the dotted line 13 in FIG. 11).

Therefore, in the projection display device according to the present embodiment, the arrangement position of the first diffusion plate is one of the position 12a of the luminous flux emission surfaces of the three laser light sources 1 or in the vicinity of the position, the position 12b of the luminous flux incident surface of the rod integrator 21 or in the vicinity of the position, the position 12c of the stop unit 9 or in the vicinity of the position, and the position 12d of the entrance pupil of the projection lens 11 or in the vicinity of the position in the optical path of the optical system including the three laser light sources 1 through the screen 5. The arrangement position of the second diffusion plate is one of the position 13a of the luminous flux incident surface of the display device 3 or in the vicinity of the position, the position 13b of the luminous flux emission surface of the rod integrator 21 or in the vicinity of the position, and the position 13c of the projection surface of the screen 5 or in the vicinity of the position in the optical path of the optical system including the three laser light sources 1 through the screen 5.

Thus, in the projection display device according to the present embodiment, there are a plurality of combinations as the arrangement positions of the first diffusion plate and the second diffusion plate, but six representative arrangement examples are described below.

In each arrangement example, the first diffusion plate and the second diffusion plate are the same as the first diffusion plate 14 and the second diffusion plate 15 of the projection display device according to the embodiment 1, and are assigned the same reference numerals. In each arrangement example, both of the first diffusion plate and the second diffusion plate fluctuate perpendicularly to the optical axis, but the configuration in which one of the plates fluctuates can be realized as in the embodiment 1. Each of the first diffusion plate and the second diffusion plate is provided with an ultrasonic motor as illustrated in FIG. 18 and described later although not illustrated in the attached drawings. The ultrasonic motor can fluctuate the diffusion plate by finely oscillating a piezoelectric element included in the ultrasonic motor as in the embodiment 1. The ultrasonic motor for finely oscillating the piezoelectric element is controlled by a control device for controlling the three laser light sources 1 and the display device 3. In this case, as in the embodiment 1, the ultrasonic motor is controlled so that the fluctuation speed of each of the first diffusion plate 14 and the second diffusion plate 15 can be, for example, 2.0 mm/s or more.

Figure 12:
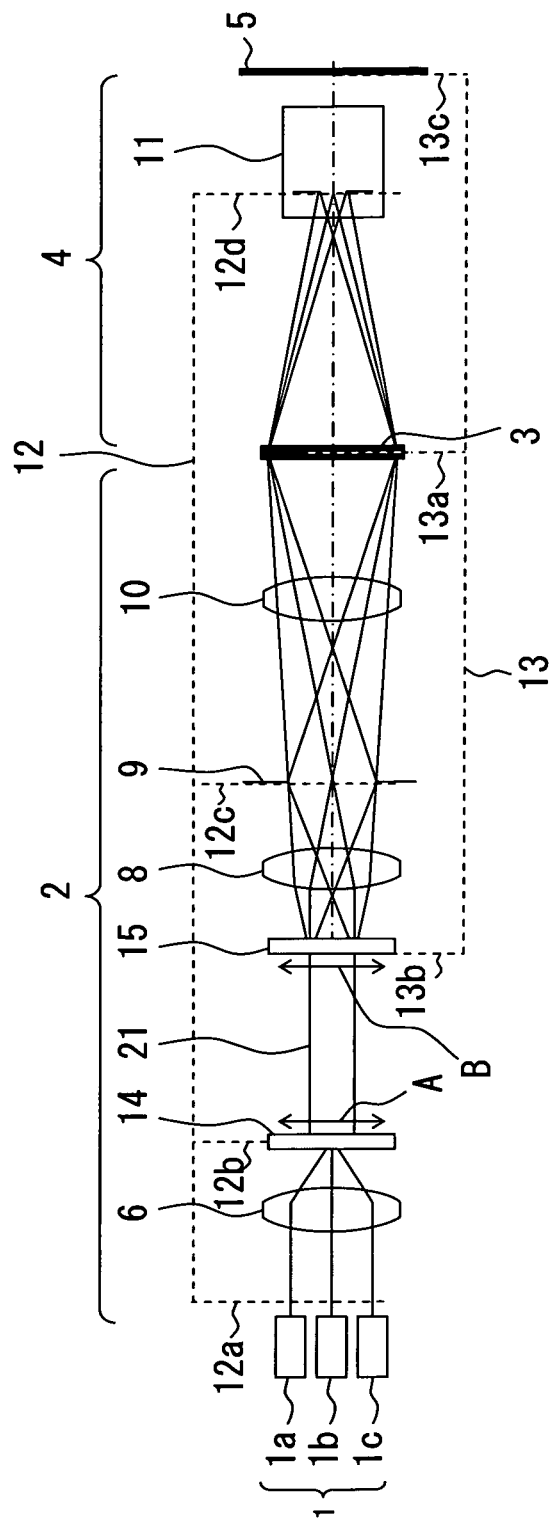
FIG. 12 is the first configuration example of the projection display device according to the embodiment 2.

FIG. 12 is the first configuration example of the projection display device according to the present embodiment.

The first configuration example illustrated in FIG. 12 is an example of arranging a first diffusion plate 14 in the position 12b (or in the vicinity of the position) of the luminous flux incident surface of the rod integrator 21, and arranging a second diffusion plate 15 in the position 13b (or in the vicinity of the position) of the luminous flux emission surface of the rod integrator 21. According to the present configuration example, the luminous flux converged by the relay lens 6 is diffused by the first diffusion plate 14 which fluctuates perpendicularly to the optical axis (for example the vertical direction indicated by the arrow A in FIG. 12). In addition, the intensity of the luminous flux diffused by the first diffusion plate 14 is leveled by the rod integrator 21. Furthermore, the luminous flux whose intensity is leveled by the rod integrator 21 is diffused by the second diffusion plate 15 which fluctuates perpendicularly to the optical axis (for example, the vertical direction indicated by the arrow B in FIG. 12).

Figure 13:
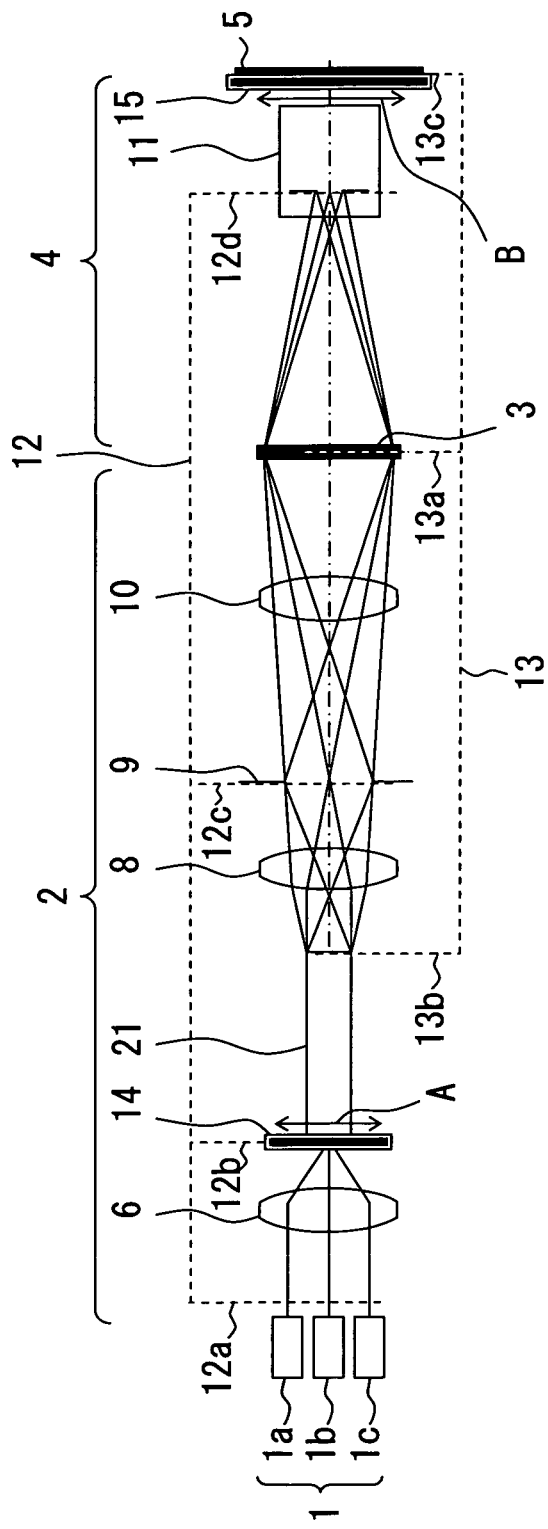
FIG. 13 is the second configuration example of the projection display device according to the embodiment 2.

FIG. 13 is the second configuration example of the projection display device according to the present embodiment.

The second configuration example illustrated in FIG. 13 is an example of arranging a first diffusion plate 14 in the position 12b (or in the vicinity of the position) of the luminous flux incident surface of the rod integrator 21, and arranging a second diffusion plate 15 in the position 13c (or in the vicinity of the position) of the projection surface of the screen 5. According to the present configuration example, the luminous flux converged by the relay lens 6 is diffused by the first diffusion plate 14 which fluctuates perpendicularly to the optical axis (for example the vertical direction indicated by the arrow A in FIG. 13). In addition, the intensity of the luminous flux diffused by the first diffusion plate 14 is leveled by the rod integrator 21. Furthermore, the luminous flux projected by the projection lens 11 is diffused by the second diffusion plate 15 which fluctuates perpendicularly to the optical axis (for example, the vertical direction indicated by the arrow B in FIG. 13).

Figure 14:
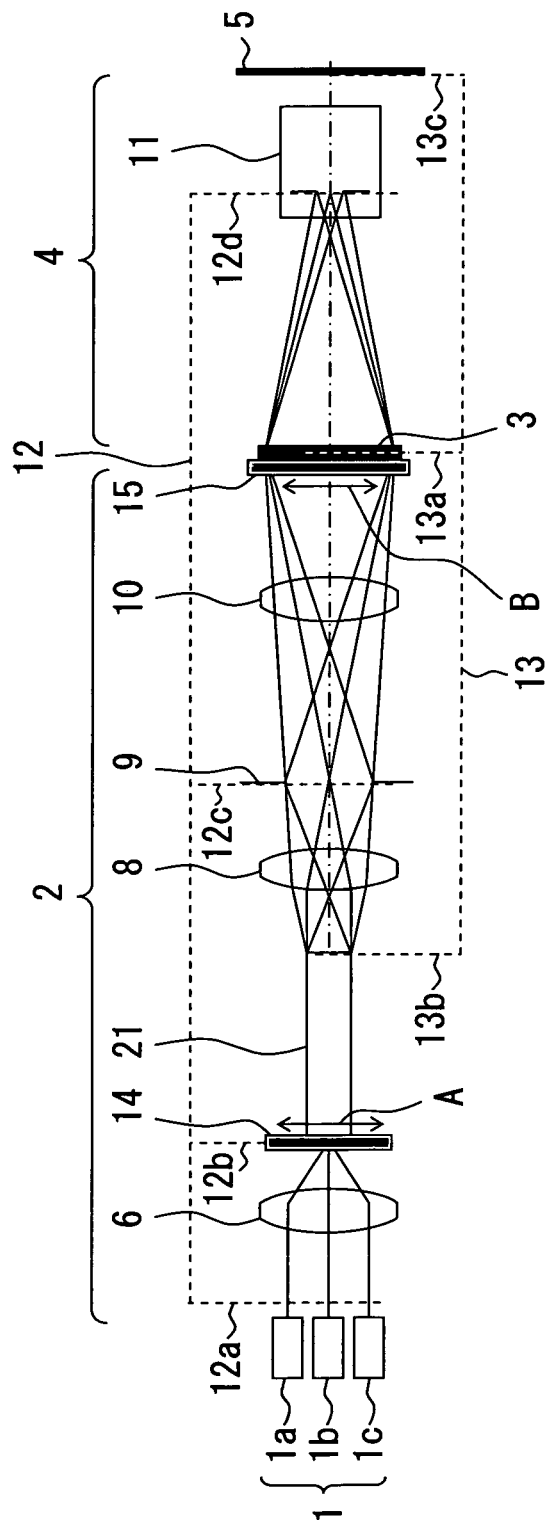
FIG. 14 is the third configuration example of the projection display device according to the embodiment 2.

FIG. 14 is the third configuration example of the projection display device according to the present embodiment.

The third configuration example illustrated in FIG. 14 is an example of arranging a first diffusion plate 14 in the position 12b (or in the vicinity of the position) of the luminous flux incident surface of the rod integrator 21, and arranging a second diffusion plate 15 in the position 13a (or in the vicinity of the position) of the luminous flux incident surface of the display device 3. According to the present configuration example, the luminous flux converged by the relay lens 6 is diffused by the first diffusion plate 14 which fluctuates perpendicularly to the optical axis (for example the vertical direction indicated by the arrow A in FIG. 14). In addition, the intensity of the luminous flux diffused by the first diffusion plate 14 is leveled by the rod integrator 21. Furthermore, the luminous flux transmitted through the relay lens 10 is diffused by the second diffusion plate 15 which fluctuates perpendicularly to the optical axis (for example, the vertical direction indicated by the arrow B in FIG. 14).

Figure 15:
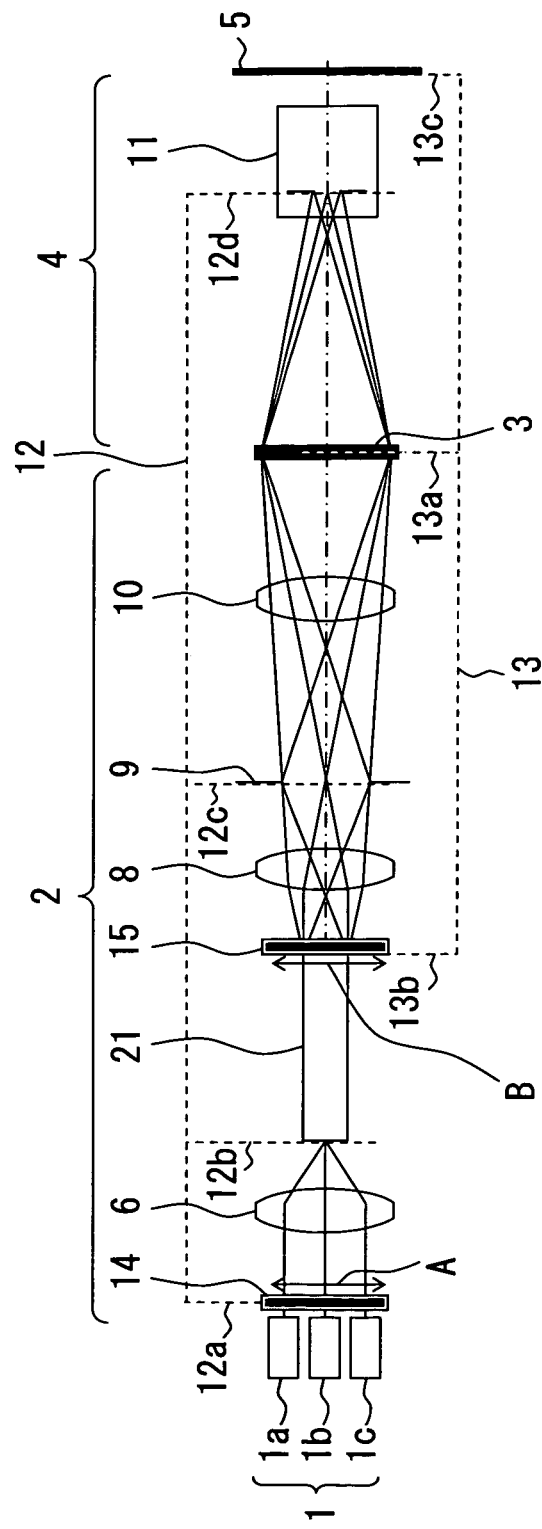
FIG. 15 is the fourth configuration example of the projection display device according to the embodiment 2.

FIG. 15 is the fourth configuration example of the projection display device according to the present embodiment.

The fourth configuration example illustrated in FIG. 15 is an example of arranging a first diffusion plate 14 in the position 12a (or in the vicinity of the position) of the luminous flux emission surface of the three laser light sources 1, and arranging a second diffusion plate 15 in the position 13b (or in the vicinity of the position) of the luminous flux emission surface of the rod integrator 21. According to the present configuration example, the luminous flux emitted from each of the three laser light sources 1 is diffused by the first diffusion plate 14 which fluctuates perpendicularly to the optical axis (for example the vertical direction indicated by the arrow A in FIG. 15). In addition, the intensity of the luminous flux converged by the relay lens 6 is leveled by the rod integrator 21. Furthermore, the luminous flux whose intensity is leveled by the rod integrator 21 is diffused by the second diffusion plate 15 which fluctuates perpendicularly to the optical axis (for example, the vertical direction indicated by the arrow B in FIG. 15).

Figure 16:
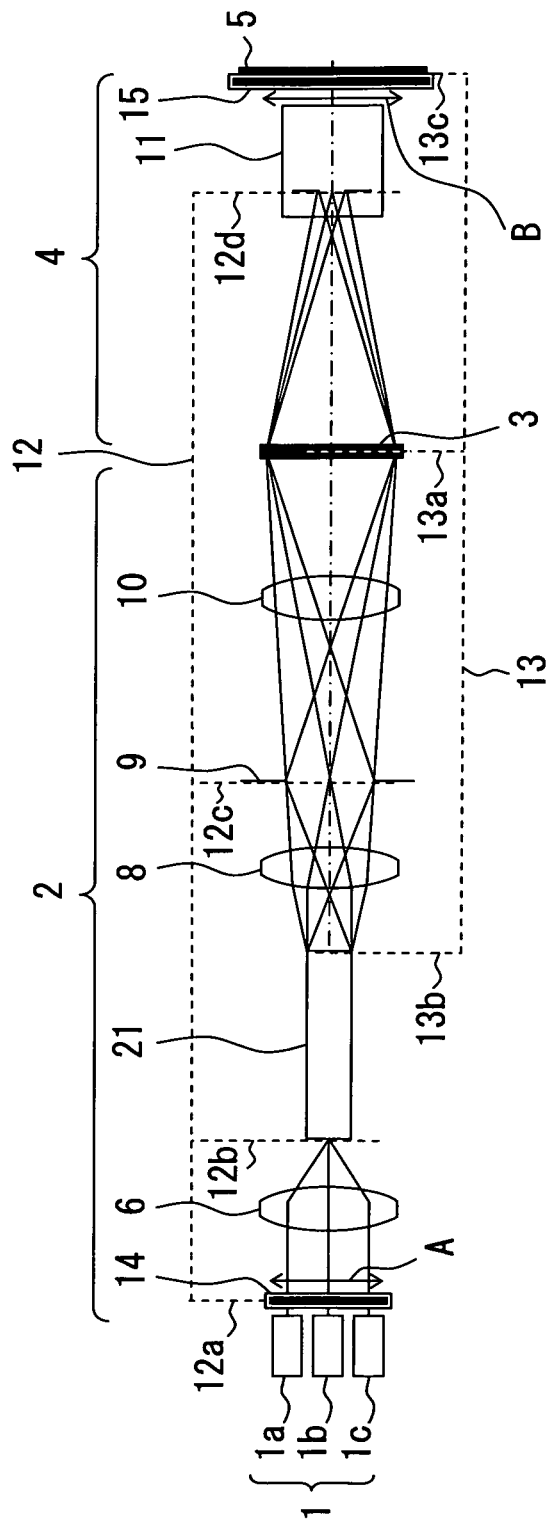
FIG. 16 is the fifth configuration example of the projection display device according to the embodiment 2.

FIG. 16 is the fifth configuration example of the projection display device according to the present embodiment.

The fifth configuration example illustrated in FIG. 16 is an example of arranging a first diffusion plate 14 in the position 12a (or in the vicinity of the position) of the luminous flux emission surface of the three laser light sources 1, and arranging a second diffusion plate 15 in the position 13c (or in the vicinity of the position) of the projection surface of the screen 5. According to the present configuration example, the luminous flux emitted from each of the three laser light sources 1 is diffused by the first diffusion plate 14 which fluctuates perpendicularly to the optical axis (for example the vertical direction indicated by the arrow A in FIG. 16). In addition, the intensity of the luminous flux converged by the relay lens 6 is leveled by the rod integrator 21. Furthermore, the luminous flux projected by the projection lens 11 is diffused by the second diffusion plate 15 which fluctuates perpendicularly to the optical axis (for example, the vertical direction indicated by the arrow B in FIG. 16).

Figure 17:
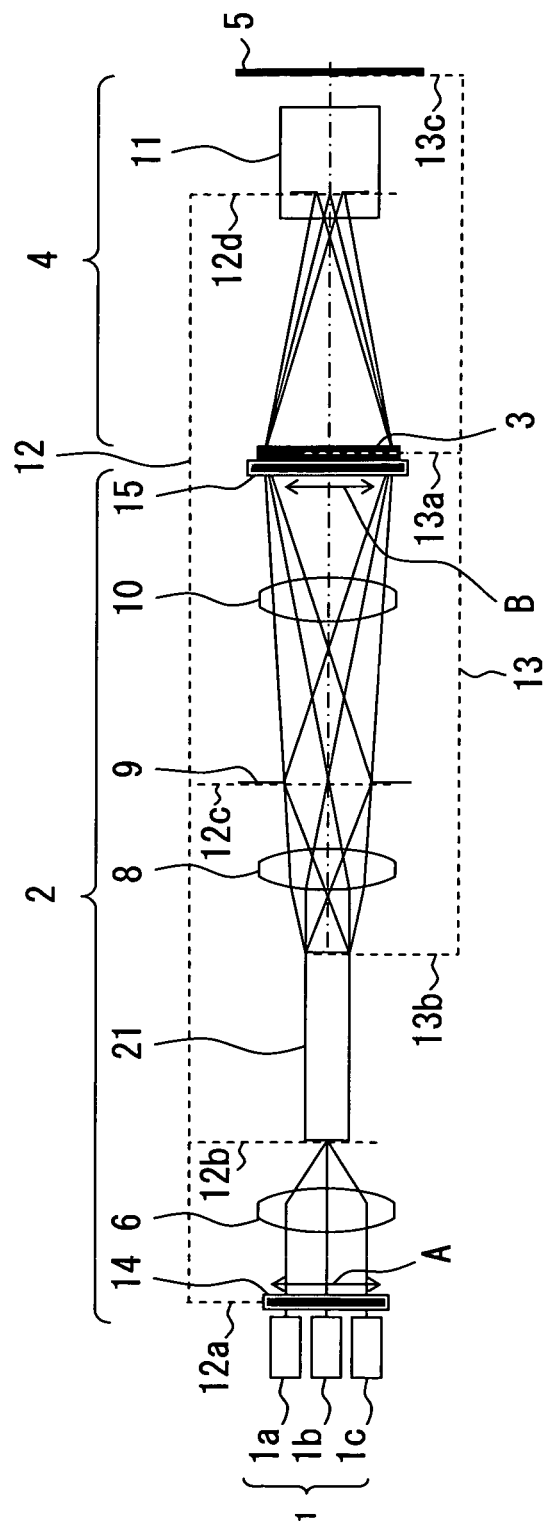
FIG. 17 is the sixth configuration example of the projection display device according to the embodiment 2.

FIG. 17 is the sixth configuration example of the projection display device according to the present embodiment.

The sixth configuration example illustrated in FIG. 17 is an example of arranging a first diffusion plate 14 in the position 12a (or in the vicinity of the position) of the luminous flux emission surface of the three laser light sources 1, and arranging a second diffusion plate 15 in the position 13a (or in the vicinity of the position) of the luminous flux incident surface of the display device 3. According to the present configuration example, the luminous flux emitted from each of the three laser light sources 1 is diffused by the first diffusion plate 14 which fluctuates perpendicularly to the optical axis (for example the vertical direction indicated by the arrow A in FIG. 17). In addition, the intensity of the luminous flux converged by the relay lens 6 is leveled by the rod integrator 21. Furthermore, the luminous flux transmitted through the relay lens 10 is diffused by the second diffusion plate 15 which fluctuates perpendicularly to the optical axis (for example, the vertical direction indicated by the arrow B in FIG. 17).

In the configuration examples illustrated in FIGS. 12 through 17, the configuration examples illustrated in FIGS. 12, 14, 15, and 17 are also examples of arranging the first diffusion plate 14 and the second diffusion plate 15 in the optical path of the optical system for illumination 2.

Thus, in the projection display device according to the present embodiment, in the combinations of the arrangement positions of the first diffusion plate 14 and the second diffusion plate 15, the arrangement positions can be changed.

With the above-mentioned configuration, it is obvious that the projection display device according to the present embodiment can obtain an effect similar to the effect of the projection display device according to the embodiment 1. Furthermore, there is no possibility that nonuniform illumination occurs on the image projected on the screen 5 by the effect of leveling the intensity of a luminous flux by the rod integrator 21.

In the projection display device according to the present embodiment, as with the projection display device according to the embodiment 1, it is desired that at least one of the first diffusion plate 14 and the second diffusion plate 15 is an optical diffusion device.

Also in the projection display device according to the present embodiment, it is possible to configure the first diffusion plate 14, the rod integrator 21, and the second diffusion plate 15 in a unitary construction. However, in this case, a fluctuating diffusion plate is configured in a unitary construction such that the plate can be fluctuated.

In addition, it is possible in the projection display device according to the present embodiment that a reflective display device can be used as a display device. The reflective display device can form on the projection surface an image formed in the illuminated area by reflecting the luminous flux illuminating in the illuminated area.

FIG. 18 is an example of a configuration of the projection display device according to the present embodiment using a reflective display device.

As illustrated in FIG. 18, the projection display device includes as light sources for emitting coherent light a red laser light source 31r, a green laser light source 31g, and a blue laser light source 31b. The red laser light source 31r and the blue laser light source 31b are semiconductor laser light sources, and the green laser light source 31g is an SHG (second harmonic generation) laser light source.

After the laser light emitted from the red laser light source 31r is converted into parallel luminous fluxes having substantially equal diameters by a collimator lens 32, it is reflected by a mirror 33, and transmits through a dichroic mirror 34 and a dichroic mirror 35. The laser light emitted from the green laser light source 31g transmits through a condenser lens 36, and is converted into parallel luminous fluxes having substantially equal diameters by a collimator lens 37, reflected by the dichroic mirror 34, and passes through the dichroic mirror 35. The laser light emitted from the blue laser light source 31b is converted into parallel luminous fluxes having substantially equal diameters by the collimator lens 38, and then reflected by the dichroic mirror 35.

The luminous flux transmitted through or reflected by the dichroic mirror 35 is diffused by a first optical diffusion device 39, and enters a rod integrator 40. After the flux repeats the reflection on the mirror in the rod integrator 40, the flux is emitted from the rod integrator 40, and then diffused by a second optical diffusion device 41. In the present embodiment, the first optical diffusion device 39 has the entire diffusion angle of 20°. In addition, an ultrasonic motor 52 is fixed via a frame 51 to each of the first optical diffusion device 39 and the second optical diffusion device 41 as illustrated in detail in FIG. 19. By finely oscillating the piezoelectric element included in both or one of the ultrasonic motors 52, both or one of the first optical diffusion device 39 and the second optical diffusion device 41 can be fluctuated perpendicularly to the optical axis.

After the luminous flux diffused by the second optical diffusion device 41 passes through a condenser lens 42 and a filed lens 43, it illustrates a reflective display device 44. The reflective display device 44 is, for example, a DMD. The DMD is provided with a number of fine mirrors, and illumination light can be modulated by changing the angle of each mirror depending on an image signal.

The luminous flux illuminating the display device 44 is modulated by the display device 44 according to the image signal, and the modulated light passes through the filed lens 43, and scales up by the projection lens 45 and projected on the screen 46.

With the above-mentioned configuration, the optical system from the laser light sources 31r, 31g, and 31b to the display device 44 is an optical system for illumination, and the optical system from the display device 44 to the screen 46 is an optical system for projection.

The position of the luminous flux incident surface of the rod integrator 40 and the position of the entrance pupil of the projection lens 45 have a conjugate relationship with the position of the luminous flux emission surface of each of the laser light sources 31r, 31g, and 31b. The position of the luminous flux emission surface of the rod integrator 40 and the position of the projection surface of the screen 46 have a conjugate relationship with the position of the luminous flux incident surface of the display device 44.

The first optical diffusion device 39 is provided in the position of the luminous flux incident surface of the rod integrator 40 or in the vicinity of the position, and the second optical diffusion device 41 is provided in the position of the luminous flux emission surface of the rod integrator 40 or the in the vicinity of the position. The first optical diffusion device 39, the rod integrator 40, and the second optical diffusion device 41 can be configured in a unitary construction. However, in this case, the first optical diffusion device 39 and the second optical diffusion device 41 are configured in a unitary construction such that they can be fluctuated.

The laser light sources 31r, 31g, and 31b is controlled by a laser controller 47, and the laser controller 47 and the display device 44 are controlled by a control device 48. Thus, in the projection display device, the control device 48 controls each of the laser light sources 31r, 31g, and 31b through the laser controller 47, and controls the display device 44 according to the image signal, thereby displaying color images in the color sequence system. In addition, the ultrasonic motor 52 is controlled also by the control device 48, thereby fluctuating both or one of the first optical diffusion device 39 and the second optical diffusion device 41 perpendicularly to the optical axis.

With the projection display device having the above-mentioned configuration, in addition to the luminous flux diffusing operation by the two optical diffusion devices, that is, the first optical diffusion device 39 and the second optical diffusion device 41, the fluctuation of both or one of the first optical diffusion device 39 and the second optical diffusion device 41 can change and superpose a speckle pattern. Therefore, the speckle can be substantially completely removed. As a result, an image can be projected onto the screen 46 with the disagreeable speckle for users substantially removed. According to the experiment by the Applicant, when both of the first optical diffusion device 39 and the second optical diffusion device 41 are fluctuated, it is confirmed that the speckle has been 90% removed as compared with the case in which the first optical diffusion device 39 and the second optical diffusion device are not provided. When only one of the first optical diffusion device 39 and the second optical diffusion device 41 is fluctuated, it is also confirmed that the speckle removing effect is sufficiently acquired. In this case, specifically when the second optical diffusion device 41 provided in the position of the luminous flux emission surface of the rod integrator 40 or in the vicinity of the position is fluctuated, it is confirmed that a larger speckle removing effect can be acquired.

By the luminous flux intensity leveling operation by the rod integrator 40, the luminous flux on the luminous flux emission surface of the rod integrator 40 has a substantially uniform intensity distribution. Therefore, there occurs no uneven illumination on the image projected on the screen 46. It is desired that the entire diffusion angle of the first optical diffusion device 39 is 10° through 40°. Such a diffusion angle is desired because the frequency of optical reflection becomes low in the rod integrator 40 if the diffusion angle is set as an angle lower than 10°, thereby acquiring insufficient uniformity in optical intensity distribution, and incurs uneven illumination on the image projected on the screen 46. In addition, if the diffusion angle is set as an angle larger than 40°, the diffusion angle of the luminous flux from the luminous flux emission surface of the rod integrator 40 becomes large, the light cannot be efficiently used, and there is the possibility that sufficient luminance cannot be acquired on the image projected on the screen 46.

The applicant made an experiment on the speckle removing effect depending on the fluctuation speed of the first optical diffusion device 39 or second optical diffusion device 41. The result of the experiment is described below.

However, the speckle contrast Cs is defined as follows.

$Cs = \sigma/I$ where $\sigma$ is a standard deviation of the luminous flux intensity, and I is an average value of the luminous flux intensity.

When the first optical diffusion device 39 is fluctuated, and the second optical diffusion device 41 is not fluctuated, the speckle contrast of the following result is acquired for the fluctuation speed of the first optical diffusion device 39.

| fluctuation speed | Cs |
| --- | --- |
| 0.0 mm/s | 9.5% |
| 0.5 mm/s | 6.0% |
| 1.0 mm/s | 5.0% |
| 2.0 mm/s | 4.5% |

On the other hand, when the second optical diffusion device 41 is fluctuated and the first optical diffusion device 39 is not fluctuated, the speckle contrast of the following result is acquired for the fluctuation speed of the second optical diffusion device 41.

| fluctuation speed | Cs |
|---|---|
| 0.0 mm/s | 9.5% |
| 0.5 mm/s | 6.0% |

The 9.5% Cs at the fluctuation speed of 0.0 mm/s indicates that Cs is 9.5% when the first optical diffusion device 39 and the second optical diffusion device 41 are not fluctuated.

Thus, from the result of the experiment performed by the applicant, it is confirmed that the speckle can be removed more effectively by fluctuating a least one of the first optical diffusion device 39 and the second optical diffusion device 41. In addition, since it can be confirmed that the speckle contrast decreases when the fluctuation speed is increased, it is preferable that the fluctuation speed is, for example, 2.0 mm/s or more.

The embodiments 1 and 2 are described above. In the projection display device according to each of the embodiments, the diffusion plate or the optical diffusion device fluctuates perpendicularly to the optical axis by the ultrasonic motor, but it is obvious that other fluctuating units can be used.

Figure 20:
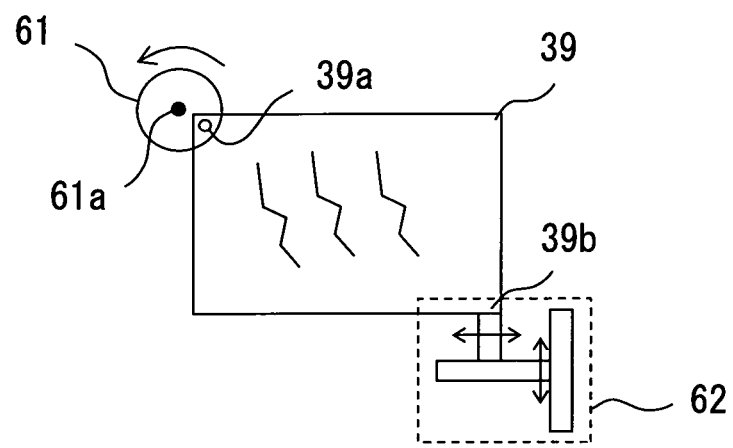
FIG. 20 is an explanatory view of another example of a fluctuating unit.

FIG. 20 is an explanatory view of another example of a fluctuating unit.

In this example, the first optical diffusion device 39 is fluctuated.

Figure 1:
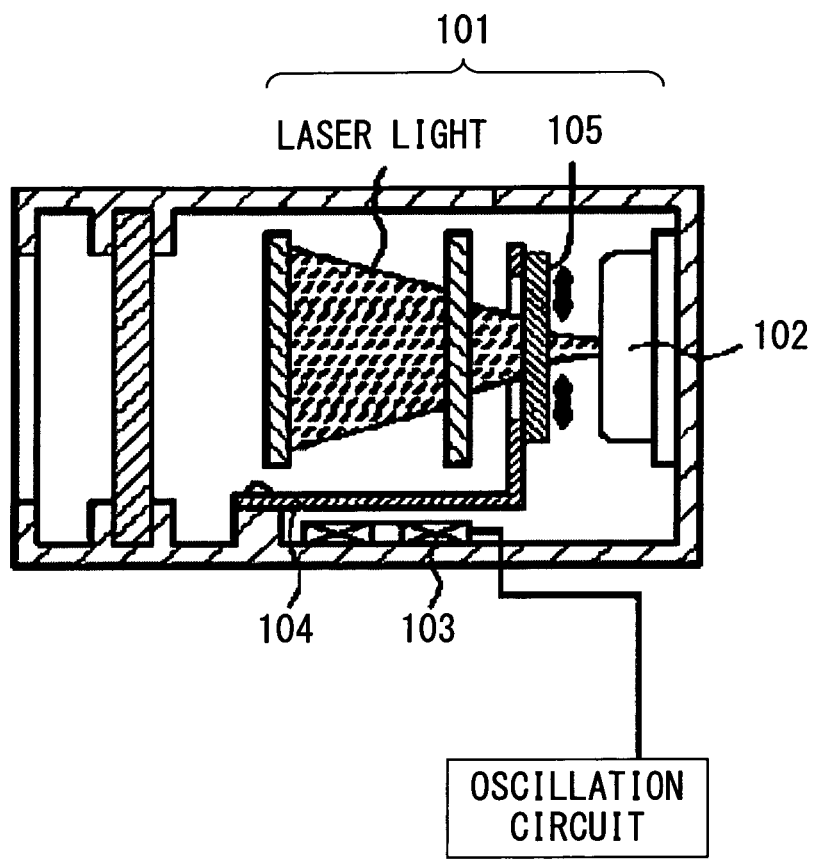
FIG. 1 is a schematic diagram of an operating illumination device disclosed as a prior art.
Figure 2:
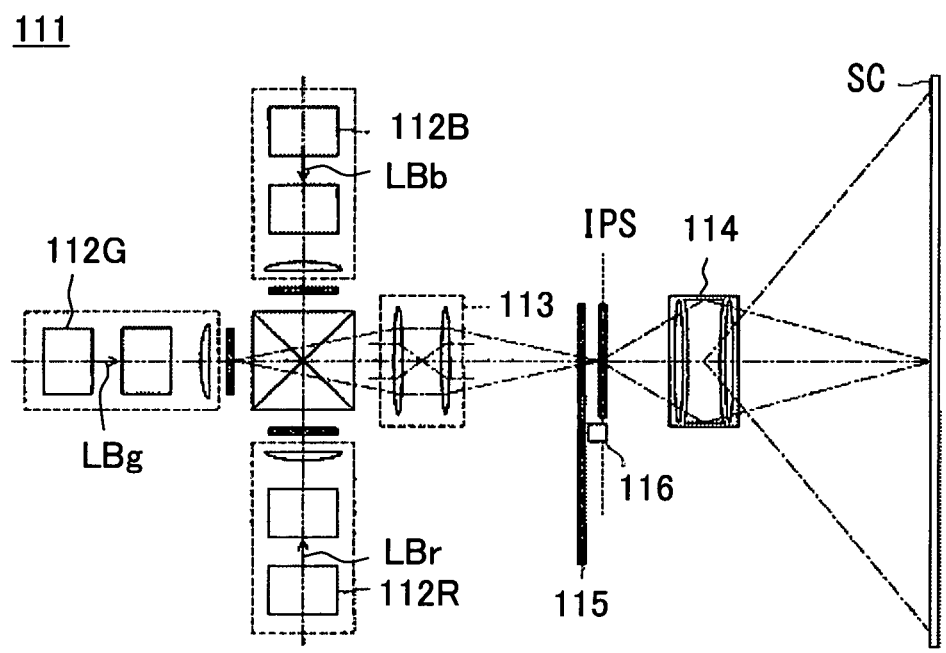
FIG. 2 is an explanatory view of the rough configuration of the projector disclosed as a prior art.
Figure 3:
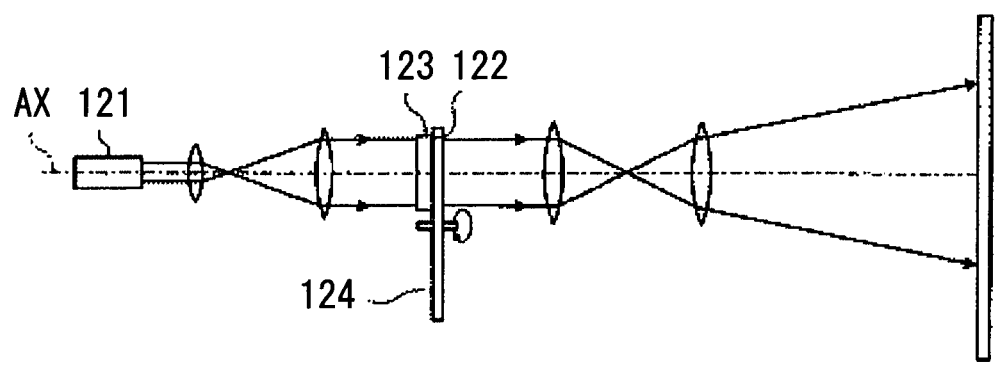
FIG. 3 is an explanatory view of the behavior etc. of the light in the optical system of the projector disclosed as a prior art.
Figure 4:
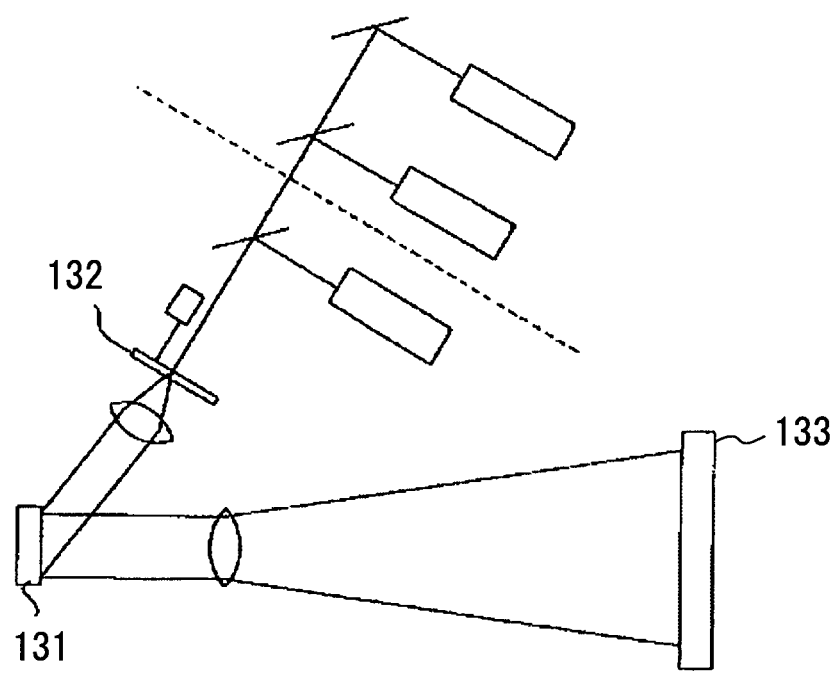
FIG. 4 illustrates a coherent light display device having a diffusion element disclosed as a prior art.

The fluctuating unit illustrated in FIG. 20 fluctuates the first optical diffusion device 39 by allowing the first optical diffusion device 39 to perform a circular movement. In the configuration, the point on a disc 61 rotating on an axis 61*a* as a rotation axis by a motor etc. is connected to one end portion 39*a* on one diagonal line of the first optical diffusion device 39 as a pivot of the circular movement. Another end portion 39*b* is fixed to a rail unit 62 which can be slid horizontally and vertically (perpendicular to an optical axis). Thus, by rotating the disc 61 by a motor etc., the first optical diffusion device 39 fluctuates as drawing a circle perpendicularly to the optical axis. In this case, the motor etc. is controlled by the above-mentioned control device. With the configuration, the speckle removing effect similar to that described above can be acquired. Also with the configuration, the first optical diffusion device 39 does not rotate as, for example, illustrated in FIGS. 2 and 3, thereby preventing a larger device.

The present invention has been described above in detail, but the present invention is not limited to the embodiments above, and it is obvious that various improvements and alterations can be made within the scope of the gist of the present invention.

As described above, according to the present invention, the projection display device can efficiently remove speckle substantially completely with a simple configuration, and display a high-quality image.

What is claimed is:

1. A projection display device which displays an image by projecting the image on a screen, comprising:
at least one light source outputting coherent light;
a display device forming an image to be displayed on the screen in an area illuminated by a luminous flux from the light source;
a first diffusion unit diffusing the luminous flux;
a second diffusion unit diffusing the luminous flux; and
a luminous flux intensity leveling unit leveling intensity of the luminous flux;
wherein:
the first diffusion unit is provided in a light source conjugate position in an optical path of an optical system including the light source through the screen;
the second diffusion unit is provided in at least one of a display device conjugate position and a vicinity of the position in the optical path of the optical system;
at least one of the first diffusion unit and the second diffusion unit fluctuates perpendicularly to an optical axis;
the optical system including the light source through the screen comprises:
an optical system for illumination propagating the luminous flux emitted from the light source into a predetermined optical path and leading the luminous flux toward the screen; and
an optical system for projection scaling up and projecting, onto the screen, the image formed in the illuminated area of the display device,
wherein the display device forms an image to be displayed on the screen in the area illuminated by the luminous flux led by the optical system for illumination;
the first diffusion unit is provided in the light source conjugate position in the optical path of the optical system for illumination;
the second diffusion unit is provided in at least one of the display device conjugate position and the vicinity of the conjugate position in the optical path of the optical system for illumination;
the luminous flux intensity leveling unit is provided in the optical system for illumination, a luminous flux incident surface of the luminous flux intensity leveling unit has a conjugate relationship with the light source, a luminous flux emission surface of the luminous flux intensity leveling unit has a conjugate relationship with the display device;
the first diffusion unit is provided in a position of the luminous flux incident surface or a vicinity of the position; and
the second diffusion unit is provided in a position of the luminous flux emission surface or a vicinity of the position.

2. The device according to claim 1, wherein at least one of the first diffusion unit and the second diffusion unit is an optical diffusion device capable of arbitrarily forming a diffusion angle and a luminous intensity distribution form acquired when a luminous flux is transmitted.

3. The device according to claim 2, wherein the diffusion angle of the optical diffusion device is 10° through 40°.

4. The device according to claim 1, further comprising a fluctuating unit perpendicularly fluctuating at least one of the first diffusion unit and the second diffusion unit to an optical axis.

5. The device according to claim 4, wherein the fluctuating unit comprises a piezoelectric element.

6. The device according to claim 1, wherein a fluctuation speed when at least one of the first diffusion unit and the second diffusion unit fluctuates perpendicularly to an optical axis is 2.0 mm/s or more.

7. The device according to claim 1, wherein the display device reflects a luminous flux and forms an image.

8. The device according to claim 1, wherein the display device transmits a luminous flux and forms an image.

9. The device according to claim 1, wherein the luminous flux intensity leveling unit, the first diffusion unit and the second diffusion unit are configured in a unitary construction.

10. The device according to claim 1, wherein the luminous flux intensity leveling unit is a rod integrator.

* * * * *